United States Patent
Ogata

(10) Patent No.: US 9,782,844 B2
(45) Date of Patent: Oct. 10, 2017

(54) INSERT

(75) Inventor: Tatsuya Ogata, Ikoma (JP)

(73) Assignee: Daishowa Seiki Kabushiki Kaisha, Higashiosaka-shi, Osaka (JP)

(*) Notice: Subject to any disclaimer, the term of this patent is extended or adjusted under 35 U.S.C. 154(b) by 172 days.

(21) Appl. No.: 13/876,047

(22) PCT Filed: Jul. 14, 2011

(86) PCT No.: PCT/JP2011/066117
§ 371 (c)(1),
(2), (4) Date: May 29, 2013

(87) PCT Pub. No.: WO2012/046485
PCT Pub. Date: Apr. 12, 2012

(65) Prior Publication Data
US 2013/0243537 A1    Sep. 19, 2013

(30) Foreign Application Priority Data
Oct. 6, 2010 (JP) .................. 2010-226874

(51) Int. Cl.
B23C 5/20    (2006.01)
B23B 27/22    (2006.01)
B23C 5/10    (2006.01)

(52) U.S. Cl.
CPC .............. B23C 5/205 (2013.01); B23C 5/109 (2013.01); B23C 5/202 (2013.01);
(Continued)

(58) Field of Classification Search
CPC ........ B23C 2200/085; B23C 2200/125; B23C 2220/16; B23C 5/109; B23C 5/202; B23C 5/205; B23C 2200/123; B23C 2200/203
(Continued)

(56) References Cited

U.S. PATENT DOCUMENTS 3,416,209 A * 12/1968 Contrucci et al. ............ 407/101
4,618,296 A * 10/1986 Allaire et al. .................. 407/42
(Continued)

FOREIGN PATENT DOCUMENTS

CN    1445038 A    10/2003
EP    0505574 A1    9/1992
(Continued)

OTHER PUBLICATIONS

International Preliminary Report on Patentability mailed Apr. 18, 2013 in the corresponding international application No. PCT/JP2011/066117 (English translation only).
(Continued)

*Primary Examiner* — Sara Addisu
(74) *Attorney, Agent, or Firm* — Muncy, Geissler, Olds & Lowe, P.C.

(57) ABSTRACT

An insert includes a rake angle set corresponding to the hardness of a material to be cut and that can suppress an increase in the material cost even when the strength of a cut edge section is increased. The insert has a polygonal shape and includes a cutting edge portion on at least one side of the polygonal shape. The cutting edge portion includes a rake face having a convex formed on one of opposite surfaces in the thickness direction a flank face having a concave formed on a surface intersecting with the one surface in the thickness direction and a concave cutting edge that is formed between the rake face and the flank face.

3 Claims, 9 Drawing Sheets

(52) U.S. Cl.
CPC .. *B23C 2200/085* (2013.01); *B23C 2200/123* (2013.01); *B23C 2200/125* (2013.01); *B23C 2200/203* (2013.01); *B23C 2220/16* (2013.01); *Y10T 407/24* (2015.01)

(58) Field of Classification Search
USPC .................................. 407/113, 42, 114–116
See application file for complete search history.

(56) References Cited

U.S. PATENT DOCUMENTS

| | | | |
|---|---|---|---|
| 4,681,486 A * | 7/1987 | Hale | 407/114 |
| 4,743,144 A * | 5/1988 | Shikata | 407/42 |
| 5,190,418 A * | 3/1993 | Nakayama et al. | 407/42 |
| 5,207,538 A * | 5/1993 | Satran | B23C 5/2213 |
| | | | 407/113 |
| 5,244,318 A * | 9/1993 | Arai et al. | 407/42 |
| 5,692,860 A * | 12/1997 | Kramer | 407/34 |
| 5,718,540 A | 2/1998 | Satran et al. | |
| 5,755,536 A * | 5/1998 | Vollmer et al. | 407/113 |
| 5,758,994 A * | 6/1998 | Hintze et al. | 407/116 |
| 5,947,650 A | 9/1999 | Satran et al. | |
| 5,957,755 A * | 9/1999 | LaFlamme | 451/48 |
| 6,024,519 A * | 2/2000 | Okui | B23C 5/1045 |
| | | | 407/113 |
| 6,138,540 A * | 10/2000 | Niemi | 82/1.11 |
| 6,196,770 B1 * | 3/2001 | Astrom et al. | 407/40 |
| 6,238,146 B1 * | 5/2001 | Satran et al. | 407/113 |
| 6,527,486 B2 * | 3/2003 | Wiman et al. | 408/188 |
| 6,684,752 B2 * | 2/2004 | Satran | B23C 3/08 |
| | | | 407/114 |
| 6,733,212 B2 * | 5/2004 | Nagaya | B23C 5/207 |
| | | | 407/113 |
| 6,966,729 B2 * | 11/2005 | Dehn et al. | 407/113 |
| 6,974,280 B2 * | 12/2005 | Satran et al. | 407/42 |
| 7,040,844 B1 * | 5/2006 | Daiguji | B23C 5/109 |
| | | | 407/113 |
| 7,241,082 B2 * | 7/2007 | Smilovici et al. | 407/113 |
| 7,367,755 B2 * | 5/2008 | Wurfels et al. | 407/113 |
| 7,494,303 B2 * | 2/2009 | Koskinen | 407/113 |
| 8,231,311 B2 * | 7/2012 | Ballas et al. | 407/113 |
| 8,444,352 B2 * | 5/2013 | Festeau et al. | 407/113 |
| 8,475,090 B2 * | 7/2013 | Mergenthaler et al. | 408/1 R |
| 8,641,331 B2 * | 2/2014 | Zastrozynski et al. | 407/113 |
| 8,690,496 B2 * | 4/2014 | Komatsuka | 407/114 |
| 8,696,263 B2 * | 4/2014 | Saji | 407/113 |
| 8,845,241 B2 * | 9/2014 | Abe | 407/54 |
| 8,950,984 B2 * | 2/2015 | Choi et al. | 407/114 |
| 8,985,915 B2 * | 3/2015 | Ishi | B23C 5/06 |
| | | | 407/113 |
| 9,370,825 B2 * | 6/2016 | Ramesh | B23B 51/048 |
| 2002/0090272 A1* | 7/2002 | Waggle | B23B 27/141 |
| | | | 407/114 |
| 2002/0122699 A1* | 9/2002 | Noggle | B23C 5/202 |
| | | | 407/113 |
| 2003/0002929 A1* | 1/2003 | Nagashima | 407/40 |
| 2003/0219320 A1* | 11/2003 | Horiike et al. | 407/113 |
| 2004/0165961 A1 | 8/2004 | Nagaya et al. | |
| 2005/0019113 A1* | 1/2005 | Wermeister | 407/113 |
| 2007/0086865 A1* | 4/2007 | Craig | 407/113 |
| 2009/0129874 A1* | 5/2009 | Craig | 407/42 |
| 2009/0249926 A1* | 10/2009 | Serwuschok | 82/1.11 |
| 2011/0170963 A1* | 7/2011 | Smilovici et al. | 407/42 |
| 2013/0108387 A1* | 5/2013 | Ishi et al. | 409/132 |
| 2013/0129433 A1* | 5/2013 | Matsumoto et al. | 407/51 |
| 2013/0142581 A1* | 6/2013 | Volokh | B23C 5/207 |
| | | | 407/114 |
| 2013/0213196 A1* | 8/2013 | Sakai | 82/1.11 |
| 2013/0302099 A1* | 11/2013 | Choi et al. | 407/113 |
| 2014/0286719 A1* | 9/2014 | Ramesh | B23B 51/048 |
| | | | 408/199 |
| 2014/0298967 A1* | 10/2014 | Ishi | 83/13 |
| 2014/0334890 A1* | 11/2014 | Takahashi | B23C 5/2213 |
| | | | 407/114 |
| 2015/0023743 A1* | 1/2015 | Ramesh | B23B 51/048 |
| | | | 407/113 |
| 2015/0258617 A1* | 9/2015 | Kiuchi | B23C 5/1036 |
| | | | 407/42 |
| 2016/0023282 A1* | 1/2016 | Ramesh | B23B 51/048 |
| | | | 408/233 |

FOREIGN PATENT DOCUMENTS

| | | | |
|---|---|---|---|
| GB | 2146276 A * | 4/1985 | |
| JP | 02-284804 A | 11/1990 | |
| JP | 05016011 A * | 1/1993 | |
| JP | H5-51505 U | 7/1993 | |
| JP | H08-85011 A | 4/1996 | |
| JP | 2000-71107 A | 3/2000 | |
| JP | 2005-186271 A | 7/2005 | |
| JP | 2009172761 A | 8/2009 | |
| KR | 100937393 B1 | 1/2010 | |
| WO | 97/10916 A1 | 3/1997 | |
| WO | 2009-096516 A | 8/2009 | |
| WO | WO 2010021463 A2 * | 2/2010 | |

OTHER PUBLICATIONS

International Search Report of the International Searching Authority mailed Sep. 20, 2011 for the corresponding international application No. PCT/JP2011/066117 (with English translation).

The Office Action for Chinese Patent Application No. 201180048179.2 mailed on Sep. 29, 2014, which is a corresponding application of this U.S. Appl. No. 13/876,047.

Extended European Search Report of No. 11830419.5 mailed Mar. 31, 2016.

* cited by examiner

INSERT

CROSS REFERENCE TO RELATED APPLICATIONS

This application is a U.S. national stage application of PCT/JP2011/066117 filed on Jul. 14, 2011, and claims priority to, and incorporates by reference, Japanese Patent Application No. 2010-226874 filed on Oct. 6, 2010.

TECHNICAL FIELD

The present invention relates to an insert which has a polygonal shape and includes a cutting edge portion on at least one side of the polygonal shape.

BACKGROUND ART

As one type of conventional inserts, there is an insert that is formed into a flat plate shape with its opposite surfaces in the thickness direction being flat and has a rake face formed on one of the flat surfaces (see Patent Document 1, for example)

CITATION LIST

Patent Document

[Patent Document 1] JP 2000-71107A

SUMMARY OF INVENTION

In the conventional insert, the rake face is formed on the same level as the flat surface of the insert or formed as a groove thereon. Therefore, if it is intended to obtain a rake angle corresponding to the hardness of a material to be cut, etc., the fixed posture itself of the insert with respect to a rotary cutting tool has to be set as appropriate.

Also, with the rake face formed of the flat surface of the insert, in order to enhance the strength of a cutting edge portion, the entire thickness of the insert must be increased. This causes a drawback of increasing the material cost particularly when the insert is formed of sintered metal, etc.

Moreover, in the conventional insert, one cutting edge portion is formed for one insert. This increases the frequency of insert replacement during working.

The present invention was made in view of the situation described above, and it is an object thereof to provide an insert that can have a rake angle set corresponding to a material to be cut while keeping its fixed posture with respect to a rotary cutting tool constant and moreover can have enhanced use efficiency.

The first feature configuration of the insert of the present invention is that the insert has a polygonal shape, the insert comprising: a cutting edge portion which is provided on at least one side of the polygonal shape, and the cutting edge portion having, a rake face having a convex formed on one of opposite surfaces in the thickness direction;

a flank face having a concave formed on a surface intersecting with the one surface in the thickness direction;

and a concave cutting edge that is formed between the rake face and the flank face.

By forming the rake face in a shape having a convex as in the above configuration, a predetermined rake angle can be obtained without the necessity of fixing the insert at an angle with respect to the rotary cutting tool.

Also, since the convex for formation of the rake face is formed with the thickness of the convex added to the thickness of the insert, the strength of the cutting edge portion formed across the convex is enhanced.

Moreover, since the cutting edge portion is formed on each side of the insert having a polygonal shape, one insert can be used repeatedly by the number of cutting edge portions. As a result, the work efficiency of the cutting work improves, permitting reduction in work cost.

The second feature configuration of the present invention is that the rake face may be formed to have cutting edge portions of various sizes layered in a shape of contour lines.

With the above configuration, any of concave cutting edges having different curvatures can be formed for one convex. For example, various types of cutting edges equal in rake angle can be obtained by grinding the convex using grinding tools different in curvature. Therefore, cutting edge portions having the same curvature, or cutting edge portions having different curvatures, can be formed on the sides of the polygon. Thus, with this configuration, an insert excellent in cost performance can be obtained.

The third feature configuration of the present invention is that the flank face may be a concave face extending from the cutting edge portion toward the other surface in the thickness direction, and may be formed so that the cross-sectional shape of the concave face perpendicular to the thickness direction is equal at any position from the cutting edge portion toward the other surface, or so that the cross-sectional shape of the concave face perpendicular to the thickness direction is smaller in the curvature of the recess as the position is closer to the other surface from the cutting edge portion.

With the above configuration, the flank face can be formed simultaneously with formation of the cutting edge by using a cylindrical rotary grinding tool, etc. having the curvature of the cutting edge to be formed, for example. This improves the manufacture efficiency of the insert. When the flank face is a concave face the curvature of which is smaller as the position is closer to the other surface from the cutting edge portion, a larger clearance can be secured between the object to be worked on and the flank face. This ensures prevention of interference between the insert and the object to be worked on and thus permits high-quality rounding. Thus, even when the curvature of the flank face changes, the cutting edge portion and the flank face can be formed simultaneously by using a conical grinding tool, etc., for example.

BRIEF DESCRIPTION OF DRAWINGS

FIG. 1(a) shows the case where four cutting edge portions have concave cutting edges same in rounding size, and FIG. 1(b) shows the case where four cutting edge portions have concave cutting edges different in rounding size from one another.

DESCRIPTION OF EMBODIMENTS

Embodiments of the present invention will be described hereinafter with reference to the drawings.

First Embodiment

Figure 1A:
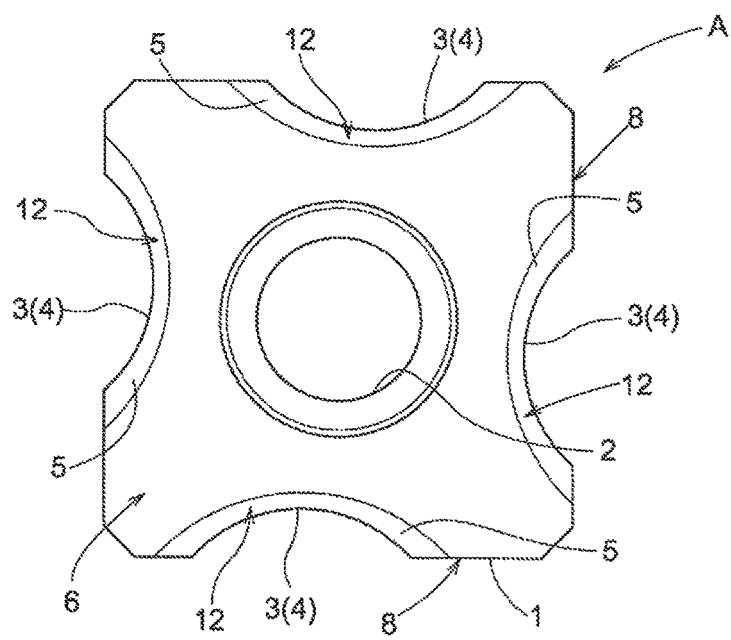
FIGS. 1(a) and 1(b) are plan views of an insert (throw-away chip), where
Figure 1B:
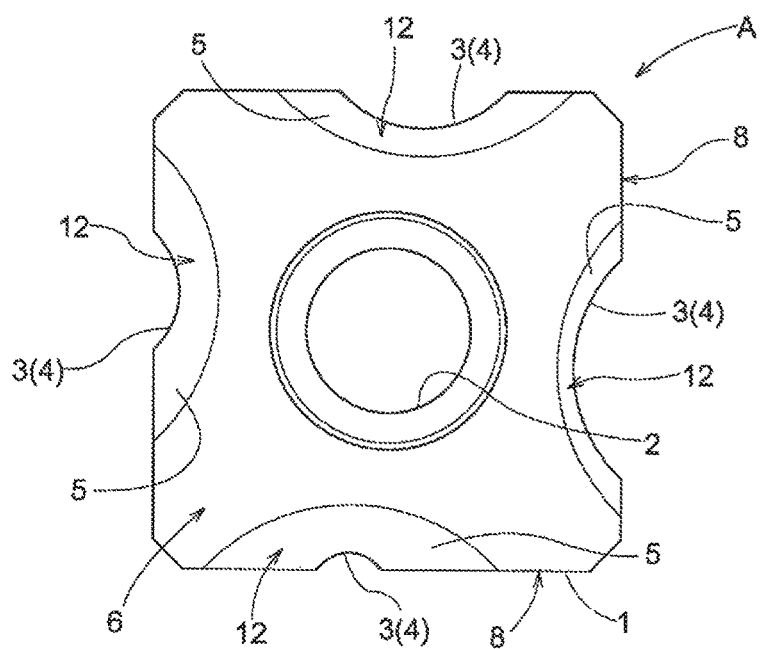

FIGS. 1 and 2 show examples of an insert of the present invention. An insert A is fixed to a rotary cutting tool C for chamfering a corner of a material D to be cut into a round shape (curved shape) as shown in FIG. 7(*a*). The insert A is formed using hard metal, etc., for example.

The insert A has a generally hexahedron shape and a generally square shape as viewed from the top. One fixation hole 2 for fixing the insert A to the rotary cutting tool C is provided in the center of the insert A. Four cutting edge portions 3 are provided at the sides of the insert A, each of the sides having one cutting edge portion 3 that has a inwardly curved shape. The curved shapes are defined to be curved toward the fixation hole 2 from one side where the cutting edge portion is placed.

FIG. 1(*a*) shows an example where concave cutting edges 4 same in rounding size (curvature of the curved face) are provided at the sides of the insert A. FIG. 1(*b*) shows an example where cutting edges 4 different in rounding size from one another are formed at the sides of the insert A.

Figure 3:
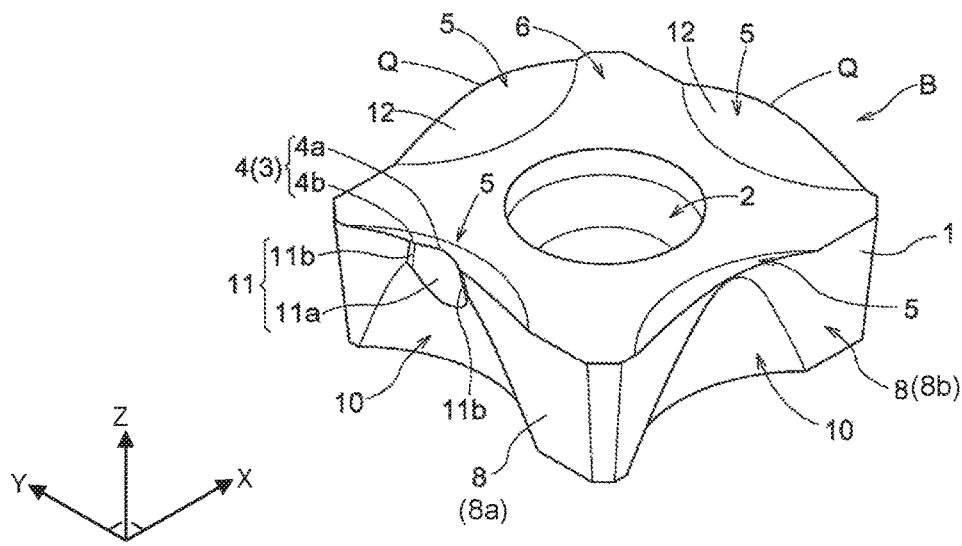
FIG. 3 is a perspective view showing a blank before formation of the cutting edge portions.

FIGS. 3 to 6 show a blank B before formation of the cutting edge portions 3. It is noted that in FIG. 3, one side, which is denoted with 8*a*, has been processed so that one cutting edge is formed on the one side. A convex 5 for formation of a rake face is formed in the thickness direction of the blank B at each of the four sides thereof. In those figures, the thickness direction of the blank is defined as Z direction, which is from the back surface 7 to the top surface 6. Two perpendicular directions with respect to the thick direction are shown as X direction and Y direction. In FIG. 3, X direction is directed from side 8*a* to the fixation hole 2 and Y direction, which is perpendicular to X direction, is directed from side 8*b* to the fixation hole 2.

The insert A includes flat top and back surfaces 6 and 7 parallel to each other on the top and back thereof in the thickness direction. Four planar side faces 8 extend between the periphery of the top and back surfaces 6 and 7. The side faces 8 are slightly inclined with respect to the thickness direction of the insert A. The insert A is in a roughly truncated pyramid shape, and placed up-side down such that the back surface is narrower than the top surface.

Figure 6:
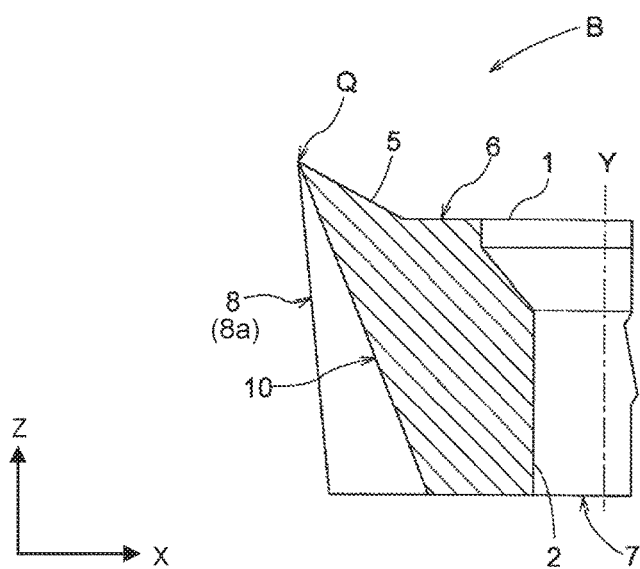
FIG. 6 is a cross-sectional view taken along line VI-VI in FIG. 4.

As shown in FIG. 6, the surface of side 8*a* moves right as it goes down (in the negative Z direction) so that an apex Q protrudes to the left (or negative X direction) more than the left edge of the back surface 7.

The convex 5 is formed toward the fixation hole 2 from each of the sides of the top surface 6, out of the pair of top and back surfaces 6 and 7. The convex 5 will become a rake face 12 to be described later. The back surface 7 will come into contact with a fixing seat surface 9*a* of a fixing seat 9 of the rotary cutting tool C as shown in FIGS. 7(*a*) and 7(*b*), functioning as an insert fixed surface.

Figure 4:
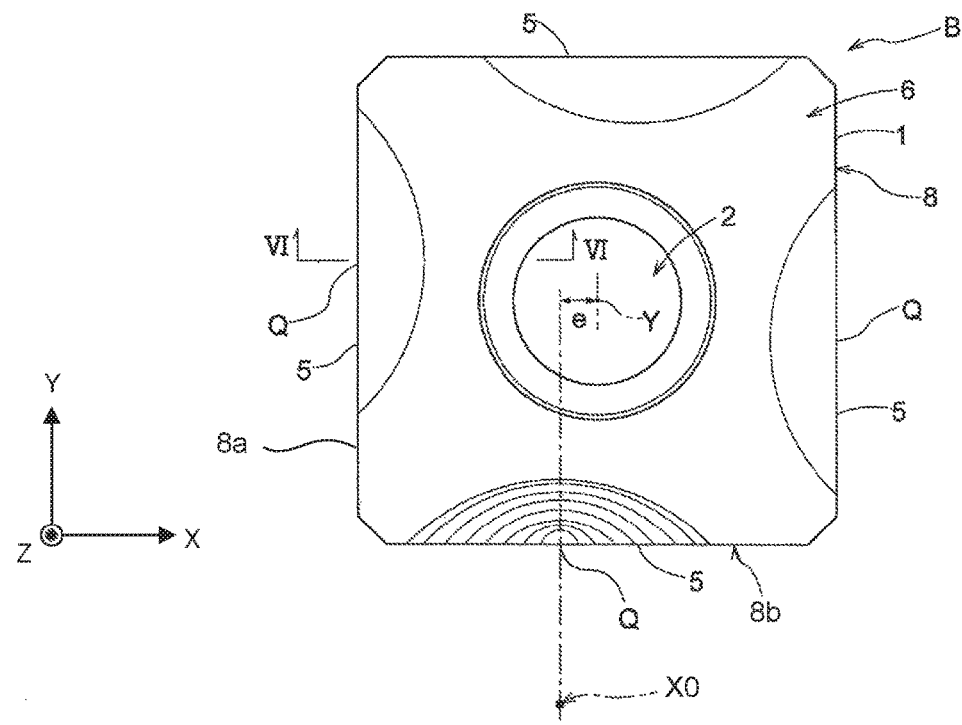
FIG. 4 is a plan view of the blank.

In FIGS. 3 and 4, four of the convexes 5 are arranged on four edges of the top surface 6. Each of the apexes Q of the convexes are arranged in the vicinity of a middle point of the edge. From the apex Q, the surface gradually inclines toward the fixation hole 2 and both ends of the edge. It is noted that apex Q is actually offseted by small difference "e" from the center of the insert. The convex 5 is however not in a precise conical shape. As shown in FIG. 4, the cutting edge 4 having a predetermined curvature must be formed within the limited area of the convex 5. In comparison among expected edges for the cutting edge 4 as shown in FIG. 4, the spacing between adjacent edges in the direction along a reference line X0 is smaller than the spacing between adjacent edges in the direction perpendicular to the reference line X0. The convex 5 therefore has a shape obtained by superposing such expected edges for formation of cutting edge portions in the above shapes.

Also, as shown in FIG. 4, the reference line X0 for each convex 5 is offset by a distance e from the fixation hole 2 provided at the center of the insert A.

With this offset setting, in formation of the cutting edge 4, the spacing between the cutting edge 4 and the fixation hole 2 becomes large, and thus the grinding amount generated by the cutting edge 4 moving in the direction toward the fixation hole 2 on the top surface 6 becomes large. Also, with the offset formation of the cutting edge 4, when the insert A is mounted on the rotary cutting tool C as shown in FIG. 7(*a*), the radius of gyration from the rotation center of the rotary cutting tool C to the cutting edge 4 becomes short. As a result, the work reaction force exerted on the cutting edge 4 from the material D to be cut at the time of working becomes small, and thus the drive torque to be provided by the rotary cutting tool C can be reduced.

A concave face 10 expanding from the apex Q of the convex 5 toward the back surface 7 is formed on each side face 8 of the insert A.

Figure 5:
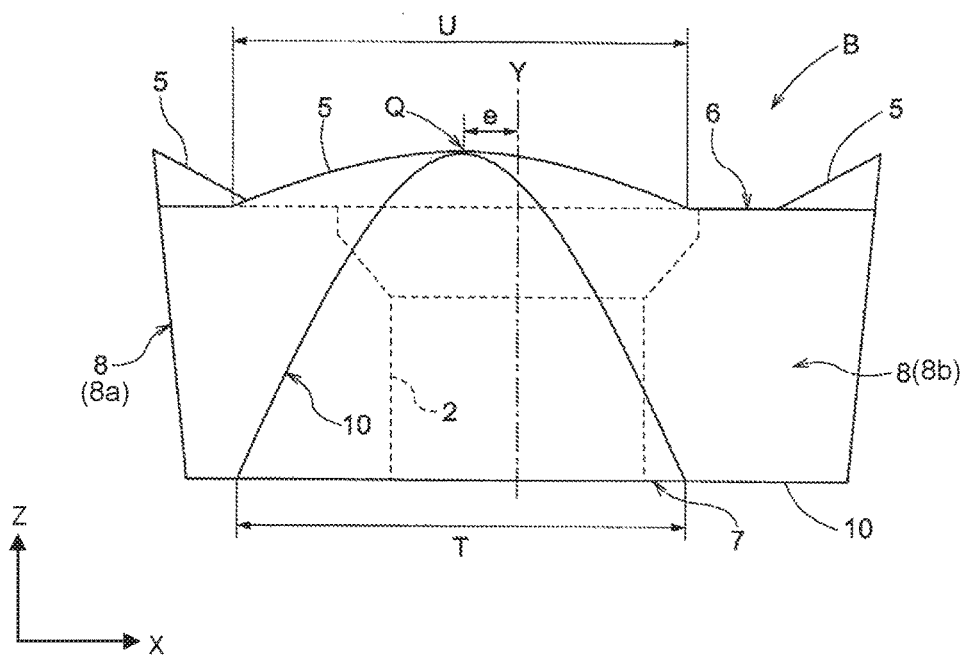
FIG. 5 is a side view of the blank.

The concave face 10 is formed from part of a predetermined conical face, for example. As shown in FIG. 5, the length T of the concave face 10 on the back surface 7 is equal to or larger than the length U of the convex 5 on the top surface 6. While a flank face 11 corresponding to the size of the cutting edge 4 is to be formed on the back side of the convex 5, the concave face 10 is formed prior to the formation of the flank face 11 by thinning each side face 8 of the insert A.

The length T is made equal to or larger than the length U because of the convenience of a grinding tool used at the formation of the cutting edge 4, for example. To form the cutting edge 4, the side face 8 is gradually ground using a cylindrical grind stone having the curvature of the cutting edge 4, for example, with the grind stone tilted at a predetermined relief angle. The amount of grinding of the side face 8 is largest when the cutting edge 4 extending in advance to the entirety of the length U is formed. In this case, since the back surface side of the side face 8 is also ground naturally, such a portion is in advance formed into a concave shape to improve the working efficiency.

Figure 2A:
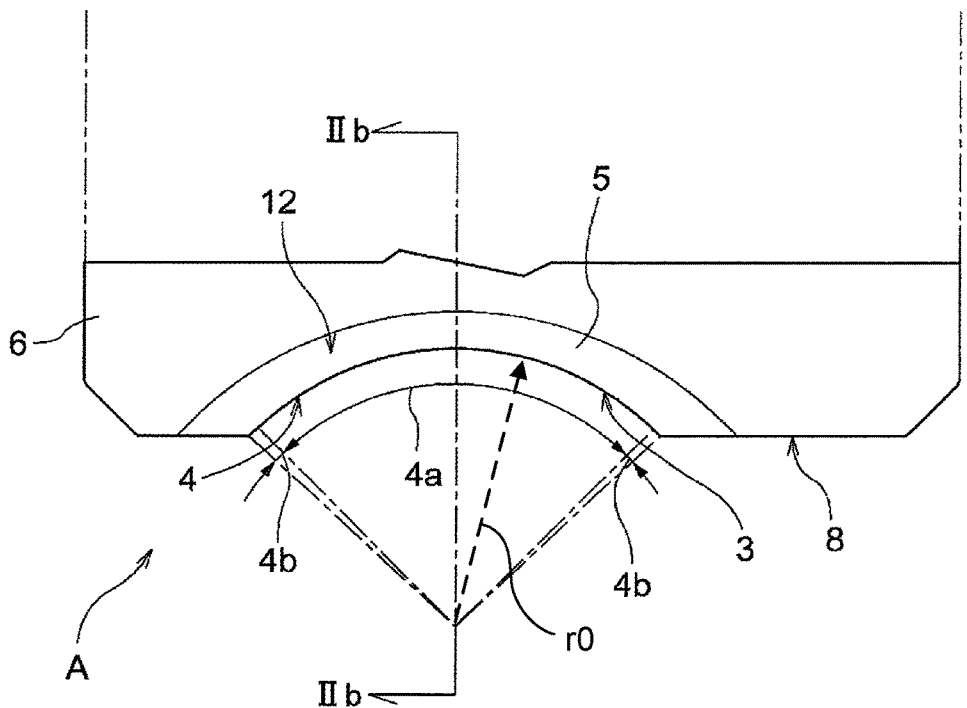
FIG. 2(a) is an enlarged plan view of a cutting edge portion.
Figure 2B:
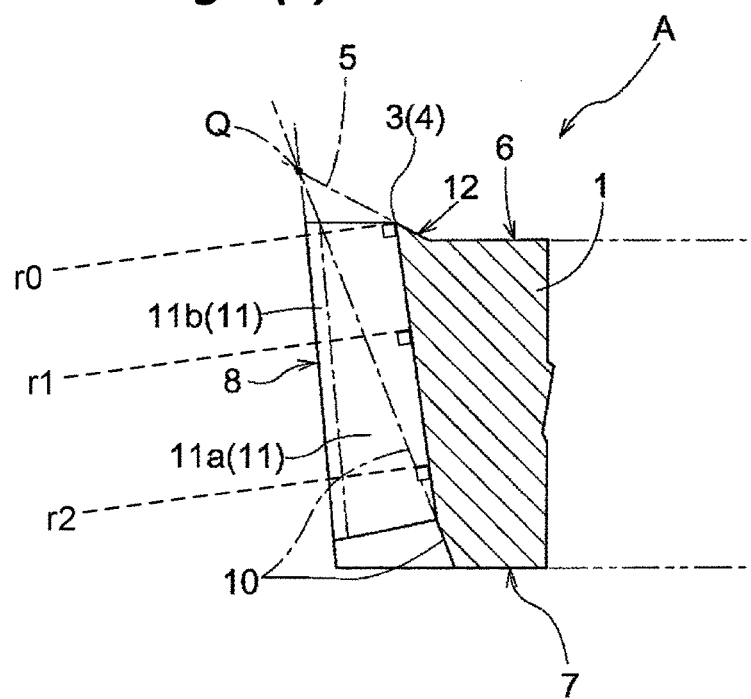
FIG. 2(b) is a cross-sectional view taken along line IIb-IIb in FIG. 2(a).

As shown in FIGS. 2(a) and 2(b), when the cutting edge 4 is formed across the convex 5 of the insert A, the remaining portion of the convex 5 serves as the rake face 12, and the back side thereof serves as the flank face 11. The flank face 11 is formed by further grinding part of the concave face 10. For example, the flank face 11 is formed by pressing a rotary grind stone, etc. against the concave face 10. The portion of the convex 5 left non-ground serves as the rake face 12, and the concave cutting edge 4 is formed as shown in FIG. 2(a).

As shown in FIG. 3, when the flank face 11 is viewed from the side of side face 8a, an arched flank face 11a is formed in the center of the flank face 11, and flat flank faces 11b are formed on both sides thereof. The arched flank face 11a is a portion formed by simply pressing the rotary grind stone, etc inwardly. As a result, as shown in FIGS. 2(a) and 3, the portion of the cutting edge 4 corresponding to the arched flank face 11a becomes an arc-shaped cutting edge 4a. Strictly speaking, the cutting edge 4 is not necessarily in a complete arc shape, but it is hereinafter referred to as the arc-shaped cutting edge for convenience sake. In this invention, the edge may be formed with a combination of several different arcs or with a combination of arcs and linear portions. In the embodiment shown in FIG. 2(a), the cutting edge 4 is configured with one arc portion, which is the arc-shaped cutting edge 4a, and two linear portions, which are linear cutting edges 4b, that are disposed on both lateral ends of the arc-shaped cutting edge 4a. The linear cutting edge 4b may extend in tangential lines drawn from the lateral ends of the arc-shaped cutting edge 4a so that the linear cutting edges 4b are smoothly connected to the arc-shaped cutting edge 4a. Strictly speaking, the linear cutting edges 4b are technically not linear because they are formed on the curved surface of the convex 5, but they are hereinafter referred to as the linear cutting edges 4b for convenience sake.

In the same fashion as the cutting edge 4, the flank face 11 as well is not necessarily formed with a single arched shape. FIGS. 2 and 3 illustrate that the flat flank faces 11b are formed to adjoin the arched flank face 11a in order to form the flank face 11. In the embodiment, the flat flank faces 11b extend in tangential lines drawn from lateral ends of the arched flank face 11a so that the flat flank faces 11b are smoothly connected to the arched flank face 11a. The arched flank face 11a links the arc-shaped cutting edge 4a. The flat flank faces 11b link the linear cutting edges 4b.

The flat flank faces 11b and the linear cutting edges 4b are provided for the purpose of, in chamfering a corner of the material D to be cut, allowing a worked curved face to continue smoothly to a non-worked flat face. Such flat flank faces 11b and the linear cutting edges 4b are formed in the following manner, for example: the cylindrical rotary grind stone is once pressed against the side face 8 and, after the ark-shaped cutting edge 4a and the arched flank face 11a are formed to a predetermined depth, the rotary grind stone is translated, from this position, in predetermined right and left directions.

By setting the outer diameter of the tool for formation of the arched flank face 11a in various ways, the cutting edges 4 having various rounding sizes can be formed using the blank B having a fixed size and shape.

Figure 7A:
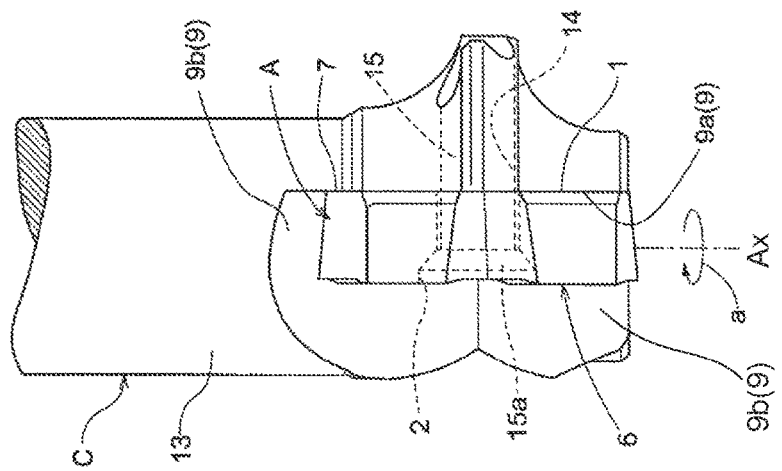
FIGS. 7(*a*) and 7(*b*) show an insert fixed to a head of a rotary cutting tool, where FIG. 7(*a*) is a plan view and FIG. 7(*b*) is a side view.
Figure 7B:
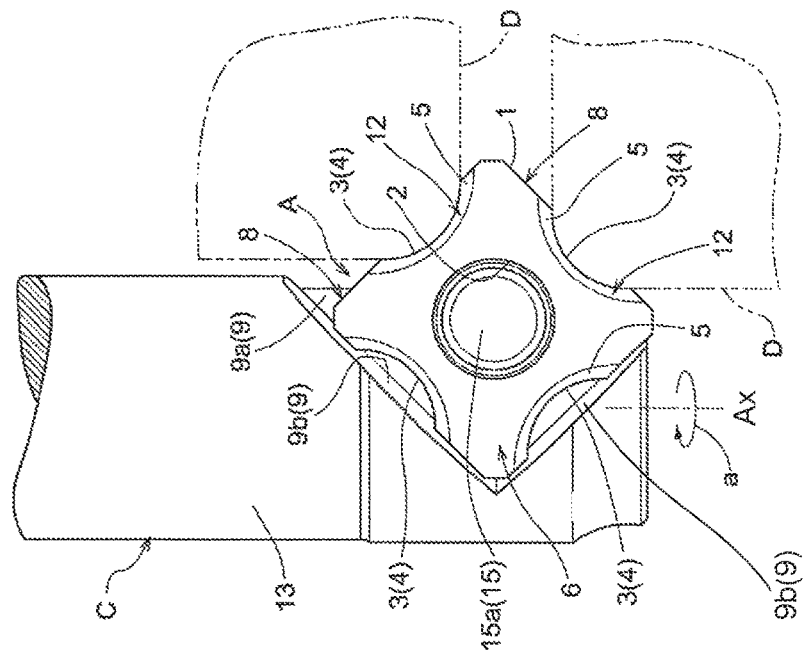

FIGS. 7(a) and 7(b) show a fixed structure of the insert A to a head 13 of the rotary cutting tool C.

The head 13 rotates in the direction of arrow a in FIGS. 7(a) and 7(b) and includes the fixing seat 9 for fixing the insert A. The fixing seat 9 includes the fixing seat surface 9a and two of the seat surfaces 9b. The fixing seat surface 9a is a surface to which the back surface 7 of the insert A comes into close contact. The seat surfaces 9b serves to prevent the insert A from rotating by pressing the two adjacent side faces 8 of the insert A against these seat surfaces 9b, one face 8 corresponding to one surface 9b. In FIG. 7(a), the turn stop seat surfaces 9b are provided in postures each intersecting at an angle of 45 degrees with respect to the rotation axis Ax of the head 13. The fixing seat surface 9a is provided to be in parallel with the rotation axis Ax of the head 13.

The fixing seat surface 9a has a fixation internal screw hole 14 formed with its axis being orthogonal to the fixing seat surface 9a. A fixing bolt 15 is inserted into the fixation hole 2 of the insert A and engaged with the fixation internal screw hole 14 to fix the insert A. In the fixed state, two side faces 8 protrude from the head 13 outward in the radial direction of the head 13. In this way, the material D to be cut can be chamfered by the cutting edge 4. In FIG. 7(a), One cutting edge 4 facing upper left chamfers a surface of the head 13 facing lower right. Simultaneously, another cutting edge 4 facing lower left chamfers another surface of the head 13 that facing upper right.

A head 15a of the fixing bolt 15 has a truncated cone shape. The fixation internal screw hole 14 and the fixation hole 2 are made eccentric to each other. When the fixing bolt 15 is screwed into the fixation internal screw hole 14, the truncated cone portion of the head 15a abuts against the slope of the fixation hole 2, pressing the insert A toward the turn stop seat surfaces 9b.

Note that, in chamfering a corner of the material D to be cut using the insert member of the present invention, the rake angles in all areas of the cutting edge 4 are not the same with respect to the material D to be cut. For example, from FIG. 7(a), it is found that the distance between the cutting edge 4 and the rotation axis Ax of the head 13 continuously changes as the position on the cutting edge 4 changes. Further, when the position of the rotation axis Ax is viewed along the direction of the plane of the insert A as shown in FIG. 7(b), it is found that the position of the cutting edge 4 and the position of the rotation axis Ax is offset from each other. Therefore, in chamfering the material D to be cut by the cutting edge 4, the rake angle is different depending on the position on the cutting edge 4. Thus, in formation of the convex 5, it may be better to devise the shape of the convex 5 in advance depending on where the cutting edge 4 is located with respect to the rotation axis Ax.

Second Embodiment

FIGS. 8 to 11 show an insert A of another embodiment.

Figure 8:
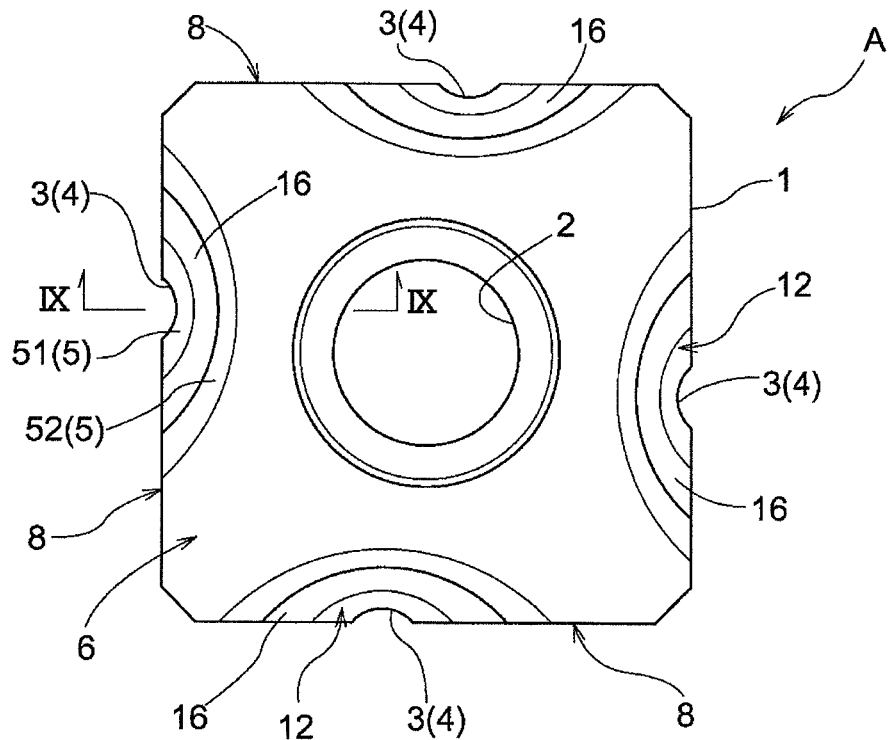
FIG. 8 is a plan view of an insert of the second embodiment.
Figure 9:
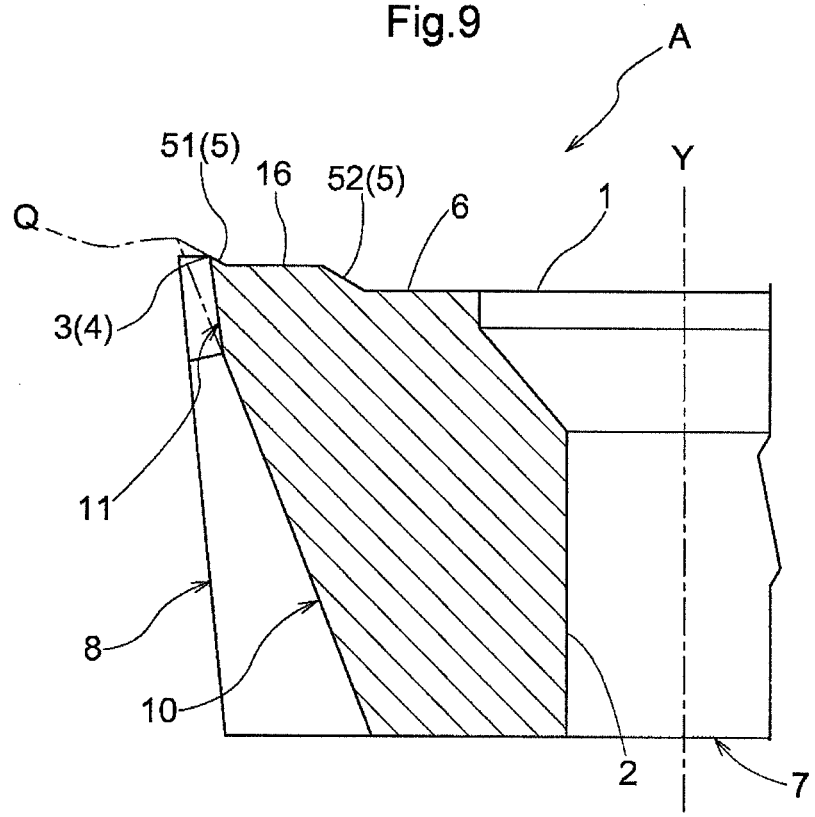
FIG. 9 is a cross-sectional view taken along line IX-IX in FIG. 8.
Figure 10:
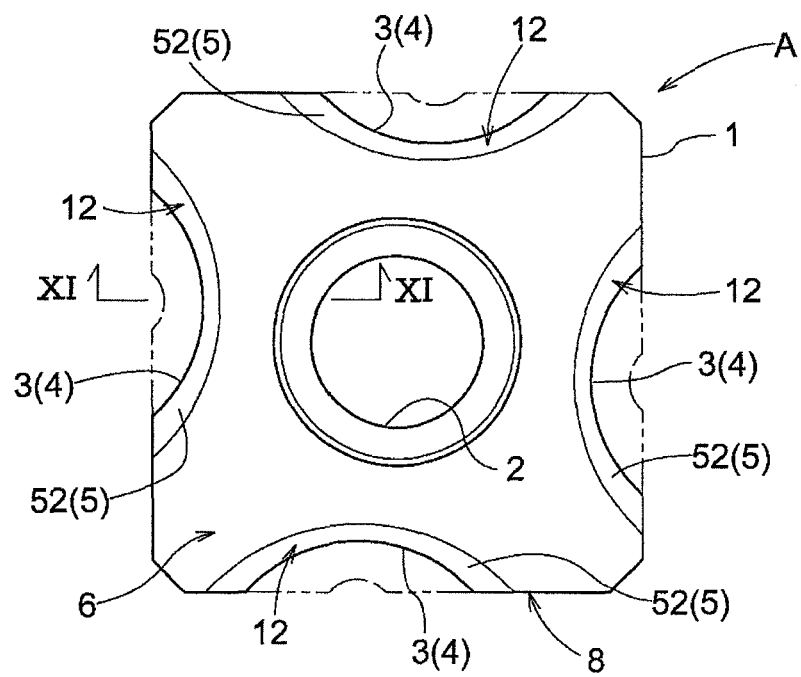
FIG. 10 is a plan view showing a state of the insert of the second embodiment having cutting edge portions newly formed.
Figure 11:
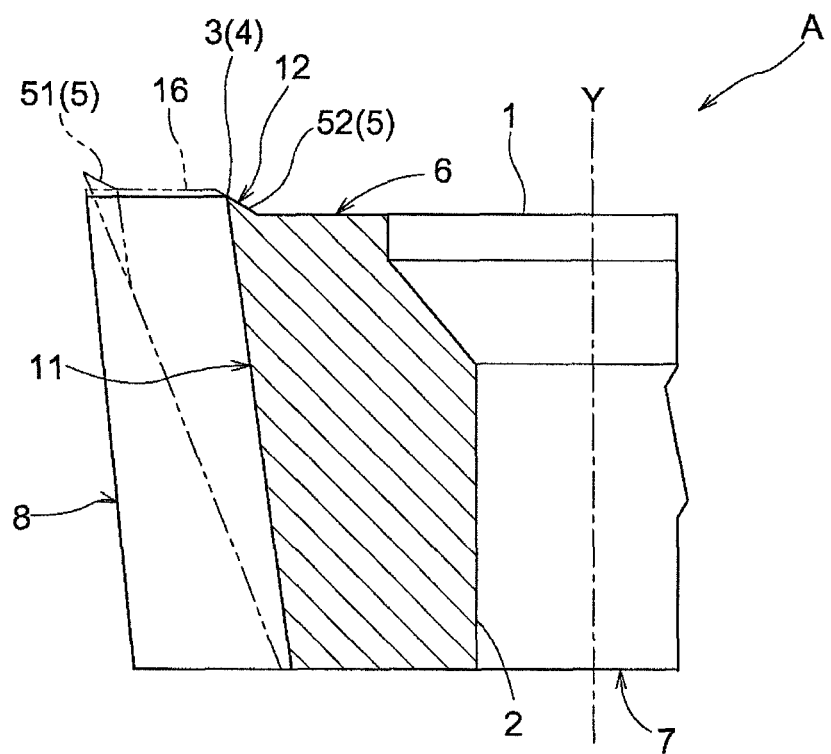
FIG. 11 is a cross-sectional view taken along line XI-XI in FIG. 10.

In this embodiment, a plurality of convexes 5 for formation of the rake face are provided for each side of the insert A. For example, an outer convex 51 and an inner convex 52 are provided as the convex 5, and a step 16 is provided therebetween. FIGS. 8 and 9 show an example of forming the cutting edge 4 across the outer convex 51, and FIGS. 10 and 11 show an example of forming the cutting edge 4 across the inner convex 52. Two or more convex s may be provided.

Segmenting the convex in advance into different regions for formation of the cutting edge 4 as described above is convenient because such regions serve as a guide when the user works on the blank to form the cutting edge 4. For example, this not only makes it easy to select the curvature of the cutting edge 4, but also permits formation of the cutting edge 4 at a proper position with the contour lines serving as a guide when a grinding tool is pressed against the insert A.

Third Embodiment

Figure 12:
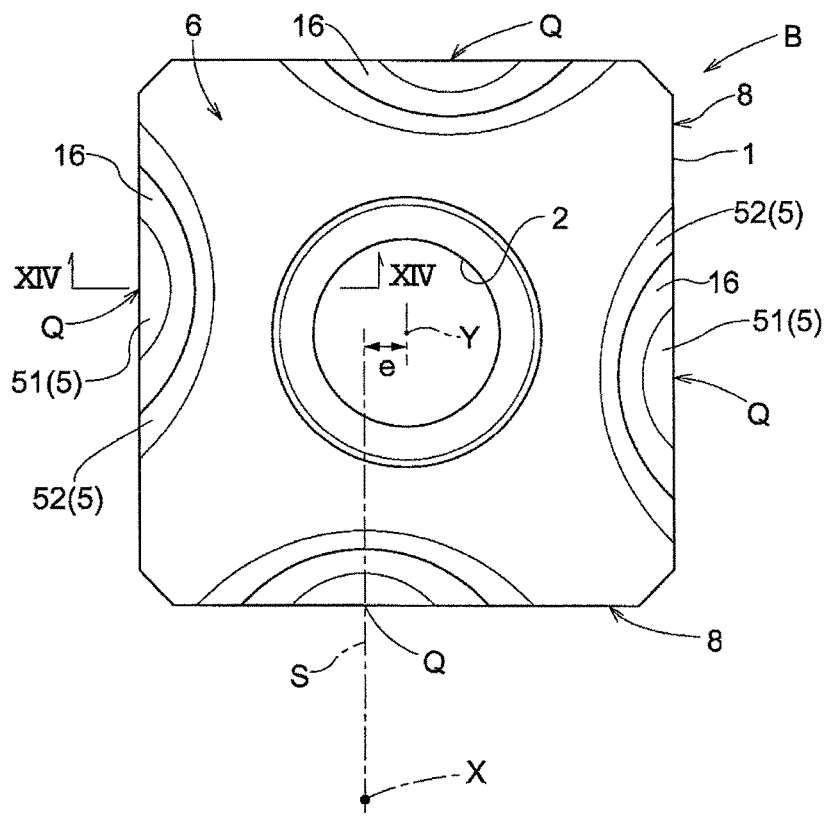
FIG. 12 is a plan view of a blank of the insert of the second embodiment before formation of the cutting edge portions.
Figure 13:
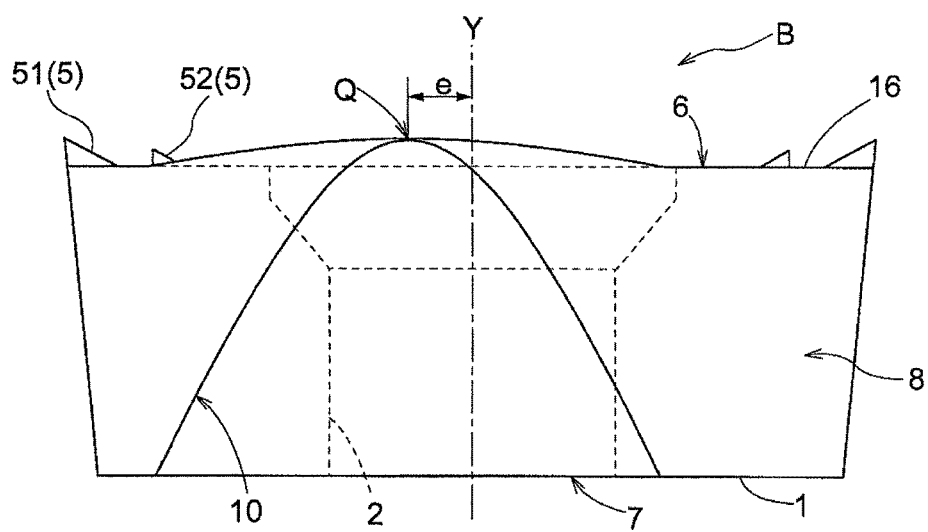
FIG. 13 is a side view of the blank of the insert of the second embodiment before formation of the cutting edge portions.
Figure 14:
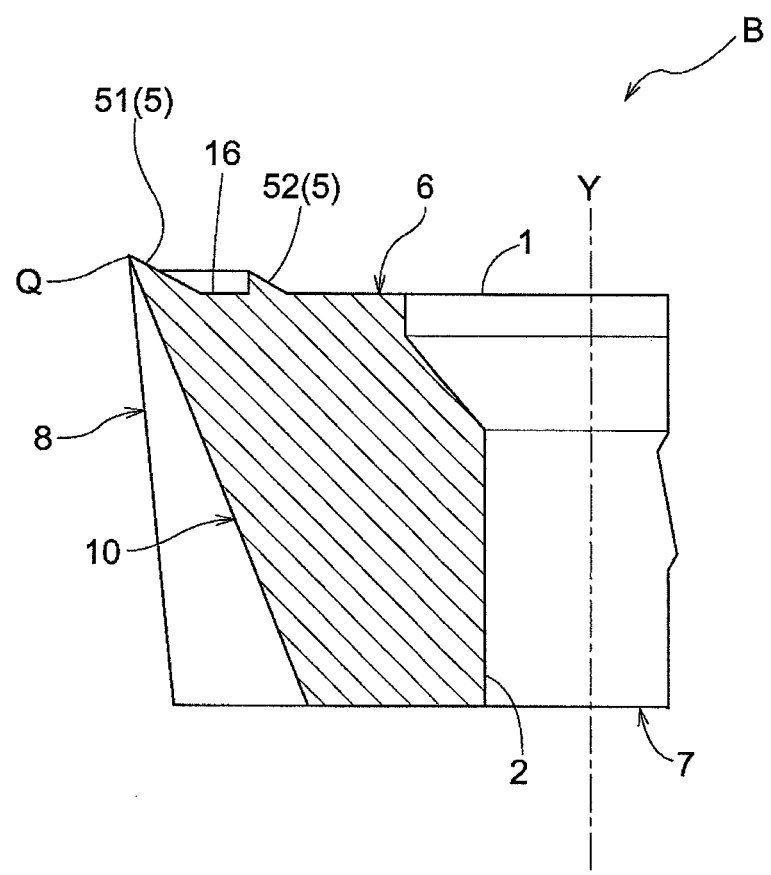
FIG. 14 is a cross-sectional view taken along line XIV-XIV in FIG. 12.

FIGS. 12 to 14 show an insert A before formation of the cutting edges 4.

In this embodiment, the step 16 between the outer convex 51 and the inner convex 52 is formed from the top surface 6 of the insert A itself. Therefore, the difference in the height from the top surface 6 between the outer convex 51 and the inner convex 52 is small.

The insert A of this embodiment is formed by casting and sintering, for example. The recess between the outer convex 51 and the inner convex 52 may be formed simultaneously with casting, etc., or only the recess may be formed by grinding, etc. after formation of the blank material for the insert A.

Other Embodiments

In the above embodiments, cutting edges having a single round (part of a circle) shape were described, but the cutting edges are not limited to this shape. For example, concave cutting edges having a plurality of round shapes may be formed. In FIGS. 2(*a*) and 2(*b*), concave of the flank face are illustrated. The curved shape of the cutting edge is shown in FIG. 2(*a*), see radius r0. The curved shape is recognized as a top of the flank face at the front surface. In FIG. 2(*b*), the radiuses of the flank face are denoted with r0 to r2 in an order from the front to back surface, the "r0" indicating the radius at the front surface (or at the cutting edge), the "r2" indicating another radius at a lower portion of the flank face, and the "r1" indicating another radius at a middle portion between the r0 and r2. Each of these radiuses is determined on a concave cross-section in a plain that is perpendicular to the side face. Based on the present invention, these concave cross-sections having radius r0 to r2 may be substantially identical from the front surface toward the back surface (or r0=r1=r2), or may continuously increase as approaching the back surface (r0<r1<r2). The radius is generally denoted with "r." Appendixes 0 to 2 mean their positions.

In the same manner as the concave cutting edges, the concave cross-sections do not have to be shaped with a single radius. The concave cross-sections may be formed by combining a plurality of radiuses. When a curve or curves that form a concave cross-section are getting larger or broader toward one direction, such a structural feature is expressed as "concave cross-sections enlarge" with an inventor's terminology. Thereby, where radiuses of concave cross-sections satisfy the formula "r0<r1<r2," that is one embodiment in which the concave cross-sections enlarge as approaching the back surface. When the concave cross-section is formed with several radiuses, it is useful to calculate average radiuses that represent entire curved shapes of the concave cross-section at different positions, and to compare them. Where the average radiuses are getting larger, it means that the concave cross-sections enlarge in the light of the invention.

INDUSTRIAL APPLICABILITY

The present invention is widely applicable to inserts provided with a cutting edge portion on at least one side of a polygonal shape.

The invention claimed is:

1. An insert which is formed in a polygonal shape having a thickness being composed with two opposing surfaces in the thickness direction and multiple side faces connected disposed between the two opposing surfaces, one of the opposing surfaces being defined as a top surface, the other of the opposing surfaces being defined as a back surface, the insert comprising:
   a concave cutting edge which is provided on at least one edge of the top surface of the polygonal shape, the concave cutting edge recessively curving toward a center of the top surface of the polygonal shape and being formed with a rake face on the top surface and a flank face on one of the side faces,
   the rake face being convex projecting from the top surface in the thickness direction; and
   the flank face being concave, which curves toward a center of the insert, extending from the concave cutting edge toward the back surface.

2. The insert according to claim 1, wherein
   a distance between both ends of the flank face, on the one of the side faces having the flank face, in a direction that is parallel to the top surface and the back surface is constant from the top surface toward the back surface.

3. The insert according to claim 1, wherein
   a distance between both ends of the flank face, on the one of the side faces having the flank face, in a direction that is parallel to the top surface and the back surface increases as approaching the back surface from the top surface.

* * * * *